United States Patent [19]

Trapet

[11] Patent Number: 5,983,512
[45] Date of Patent: Nov. 16, 1999

[54] REFERENCE OBJECT FOR COORDINATE MEASURING MACHINES AND MACHINE TOOLS

[76] Inventor: Eugen Trapet, Berlinerstrasse 12, D-38176 Bortfeld, Germany

[21] Appl. No.: 08/610,395

[22] Filed: Mar. 4, 1996

[30] Foreign Application Priority Data

Mar. 6, 1995 [DE] Germany ............................. 195 07 805

[51] Int. Cl.[6] .................................................. B25H 7/02
[52] U.S. Cl. .................................................. 33/502; 33/567
[58] Field of Search .............................. 33/502, 562, 567, 33/567.1

[56] References Cited

U.S. PATENT DOCUMENTS

| | | | |
|---|---|---|---|
| 2,536,629 | 1/1951 | De Sousa | 33/567 |
| 2,621,807 | 12/1952 | Rendich | 33/567 |
| 3,315,365 | 4/1967 | Aldeborgh | 33/567 |
| 3,846,917 | 11/1974 | Blakey | 33/567 |
| 4,360,974 | 11/1982 | De Cuissart | 33/567 |
| 5,560,408 | 10/1996 | DiFranco | 33/567 |

FOREIGN PATENT DOCUMENTS 3-281180  12/1991  Japan ..................................... 33/567.1

Primary Examiner—G. Bradley Bennett

[57] ABSTRACT

The invention relates to a low-cost, low-weight, highly stable reference object, easy to handle, for the measurement of the errors of geometry of coordinate measuring machines and machine tools. The reference object consists of an array of probing elements in the form of rings, spheres, or flats, each representing reference points by means of their surface geometry. The probing elements are glued between two panes of a geometrically stable material, establishing a firm connection between these panes. Holes in the panes enable the measuring probe of the machine under inspection to probe the reference elements' surfaces. The resulting box-type structure of the reference object gives it the said advantages of low weight, low price, and high stability.

3 Claims, 5 Drawing Sheets

REFERENCE OBJECT FOR COORDINATE MEASURING MACHINES AND MACHINE TOOLS

A patent application for this invention entitled "Prüfkörper für Koordinatenmeßagerate und Werkzeugmaschinen" was filed in Germany under the number 195 07 805.5 on Mar. 6, 1995.

FURTHER LITERATURE

[1] VDI/VDE 2617 part 3 and part 5

[2] E. Trapet, F. Wäldele: A Reference Object Based Method to Determine the Parametric Error Components of Coordinate Measuring Machines and Machine Tools, Measurement Vol. 9 No 1, January–March 1991

[3] Koordinatenmeßlgeräte rationell überwachen, QZ 37, (1992) 5

[4] Prüfkörper, German Patent Application DE 4036181 A1

BACKGROUND OF THE INVENTION

Two-dimensional reference objects for the inspection of coordinate measuring machines and machine tools in the form of ball and hole plates allow the errors of such machines to be measured with less effort (only one reference object is needed), thereby faster (typically in one day), and more cheaply (a reference object costs about $10000) as compared with other methods that require typically five days, require a set of costly reference measuring devices (typically $100,000 of worth in total), and are difficult to handle: usually, two different laser interferometers are needed, plus two electronic level meters, plus one straight edge, plus one granite square [1,2,3].

In spite of these obvious advantages, a break-through in the spread of such reference objects has not yet been reached because so far, commercially available ball plates were not optimised neither economically nor from the technical point of view. Better acceptance would be more likely if the reference objects were optimised insofar as they

- are individually tailored to the dimensions of the machines to be inspected,
- have arrays of probing elements with a small raster spacing (between 20 mm and 50 mm),
- are of light weight so that they can be handled by one person (less than 20 kg),
- allow materials with low thermal expansion to be used,
- are not more expensive than the existing ball and hole plates which do not have all the properties above (about $10000 in 1996).

A main factor of the costs for a ball or hole plate of state-of-the-art plate design is the extensive fine machining required for the bulk material used. For example, the ball seats are milled with narrow tolerances to allow to thermally shrink the balls into their matching seats (holes). Plates from rolled steel additionally require annealing for dimensional stability and surface treatments for corrosion protection.

Reducing weight by applying bores in the plate material turned out to weaken the structure in certain directions (e.g. low stiffness in the diagonals reduced the accuracy with which squareness is represented). The milling of pockets leaving a thin wall in the plate's center plane and furnishing ribs for the stability against bending turned out to be satisfactory for smaller plates but significantly increased their price. Plates bigger than 0.8 m×0.8 m with holes or pockets turned out to bend excessively (more than 0.3 mm are not allowed to keep cosine errors negligible). No state-of-the-art design allowed plates bigger than 0.5 m×0.5 m to be handled by only one person because of their weight.

SUMMARY

It is the objective of this invention to improve the design of hole and ball plates for the inspection of coordinate measuring machines and machine tools concerning weight, cost and stability, and by tailoring them in their dimensions and layout to the individual user's needs. This is achieved by gluing the probing elements (spheres, cylinders, or flats which establish a raster of reference points) between two panes in the symmetry plane of the reference object; holes in these panes allow the machine under test to probe the surfaces of each of the elements.

The panes are preferably made of special materials like quartz-ceramics, possessing a low thermal expansion coefficient and a high long-term stability. Such materials are available as mass products in the form of thin panes (e.g. about 5 mm thick). If the object were made of one single thicker pane, costs and weight would be higher without significant extra stability being obtained. The holes in the panes do not require high precision and can be made at low cost.

According to the invention, the assembly is preferably done manually, allowing individual reference objects to be manufactured to customer specifications with respect to size and layout of the raster of the probing elements.

DETAILED DESCRIPTION OF THE INVENTION

Figure 1:
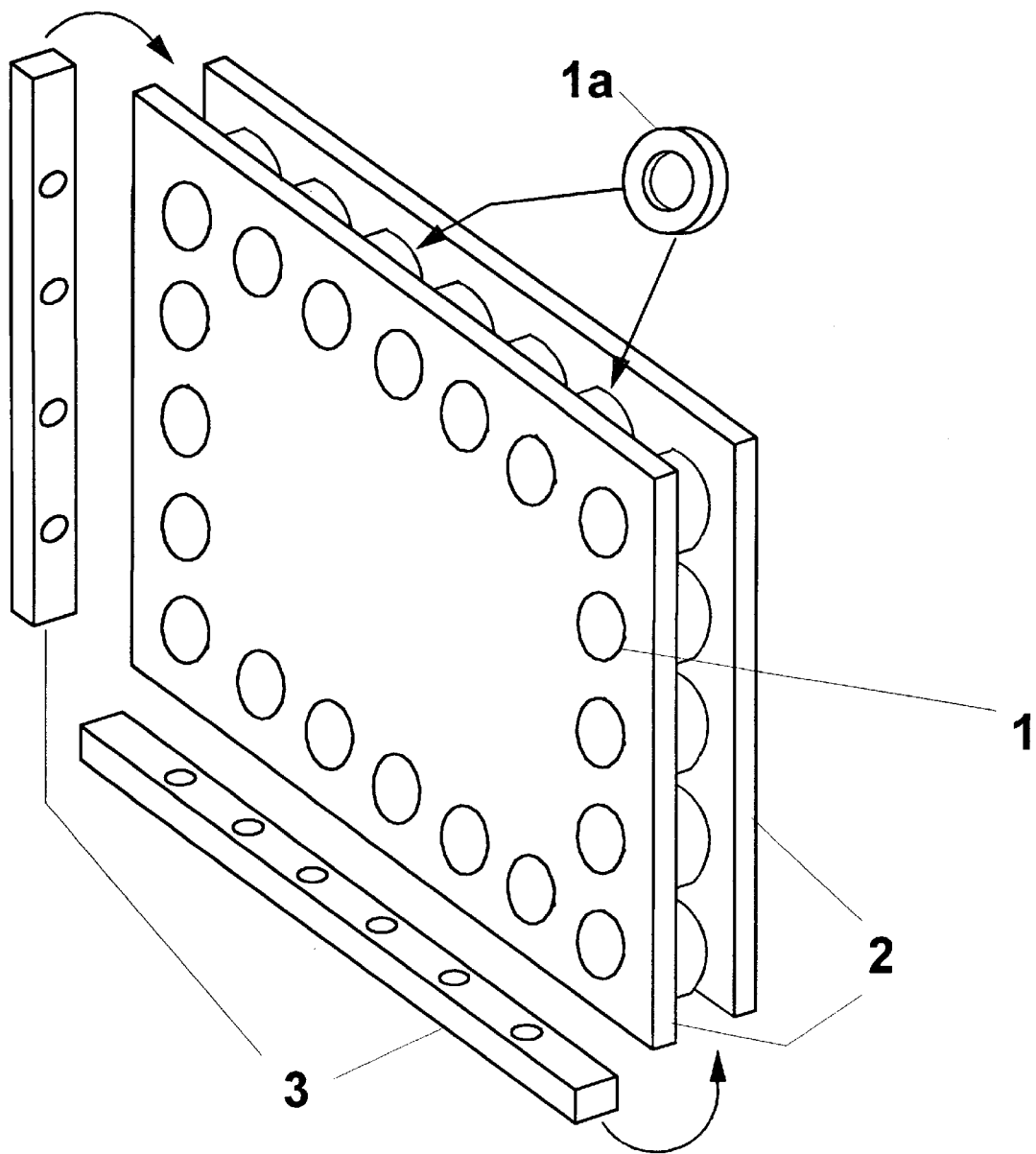
FIGS. 1–3 Reference object for the measurement of the errors of geometry of coordinate measuring machines and machine tools in the form of a sandwich structure with two panes, using alternative types of probing elements: spheres (detail 1c), rings (detail 1a), spheres flattened at the poles (detail 1b)

According to the invention, the problems of price and weight of ball and hole plates as reference objects for coordinate measuring machines (CMMs) and machine tools (MTs) can be simultaneously solved, if the reference objects are made of at least two panes arranged in parallel (detail 2 in FIG. 1), firmly connected to each other with sufficient space between them. In the space between the panes, probing elements (details 1a to 1c in FIG. 1) are located. The probing elements are advantageously used to establish a firm connection between the panes by bonding. This box-like design yields an optimum ratio of stiffness and rigidity as regards weight and price. Additional spacers are provided to bond the panes together with the desired spacing if, due to the individual layout of the array of probing elements, there are not enough probing elements to establish a stable connection of the panes.

The probing elements may be, e.g., cylindrical rings (detail 1a in FIG. 1), rings with spherical inner surfaces, truncated balls (detail 1b in FIG. 1), cylindrical plugs, complete spheres (detail 1c in FIG. 1), cones, bushings with conical inner surfaces, or pairs of small planes inclined against each other as well as against the reference object's symmetry plane at an angle of about 90°. While the centers of the spheres and spherical rings represent points in space, all other elements represent straight lines in space, of which the point of intersection with the reference object's symmetry plane must be calculated to yield the desired reference points in space.

The described design leads to the probing elements being optimally placed with their datum points in the symmetry plane of the reference object. This avoids first-order errors by a slight (out-of-plane) bending of the object.

Figure 2:
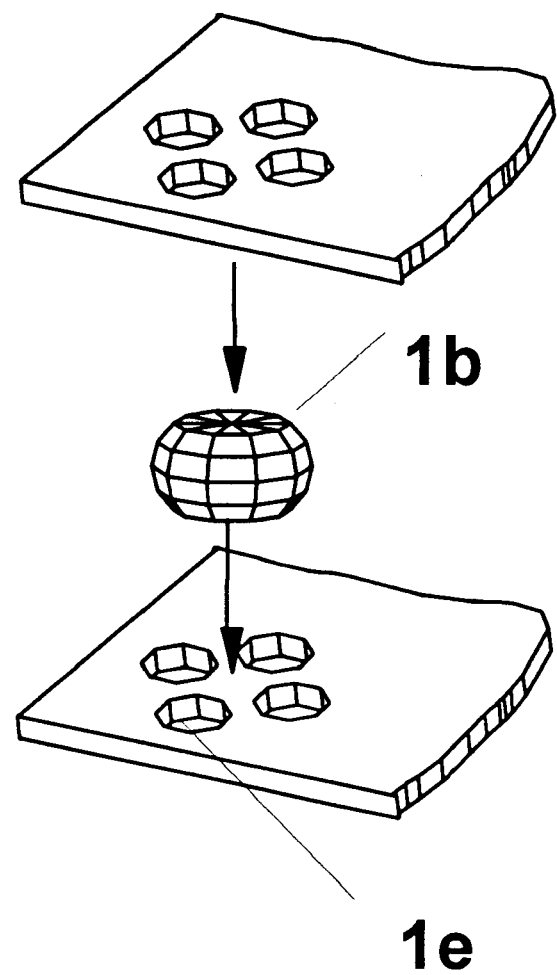

A plate manufactured according to the invention with a third pane in its symmetry plane allows the probing elements to be fixed to this central pane, whereas the probing elements are not directly connected to the two outer panes. FIG. 2 gives an example of the layout of such a three-layer plate (cross-section). The inner pane is fixed by spacers (detail 4 in FIG. 2) to either outer pane. The advantages of such a design are that the positions of the probing elements and the plate's flatness are each ensured separately and in an optimised way.

A frame (detail 3 in FIG. 1) around the panes is attached by an elastic bonding material (silicone glue). This frame is needed to clamp the plate to the CMM table without introducing stress into the panes themselves. Additionally this elastic bonding and the frame, e.g., from aluminum protects the reference object during transport against both shock and strain. The elastic fixing of the frame particularly reduces thermally induced strains due to changes of temperature in the fixtures during measurement.

No precision machining is required except for the probing elements. The probing elements may be low-cost mass products. They are made of hard (HB=60), corrosion-resistant material with a surface finish to Ra<0.2 $\mu$m. The form of the probing elements need not be better than 5 $\mu$m because of the identical probing point patterns during the calibration and during the use of the plate. The holes (detail 1e in FIG. 1) in the panes need not be made to narrow tolerances, neither with respect to their diameters nor with respect to their positions. 0.3 mm is a satisfying tolerance for either diameter and position.

Figure 3:
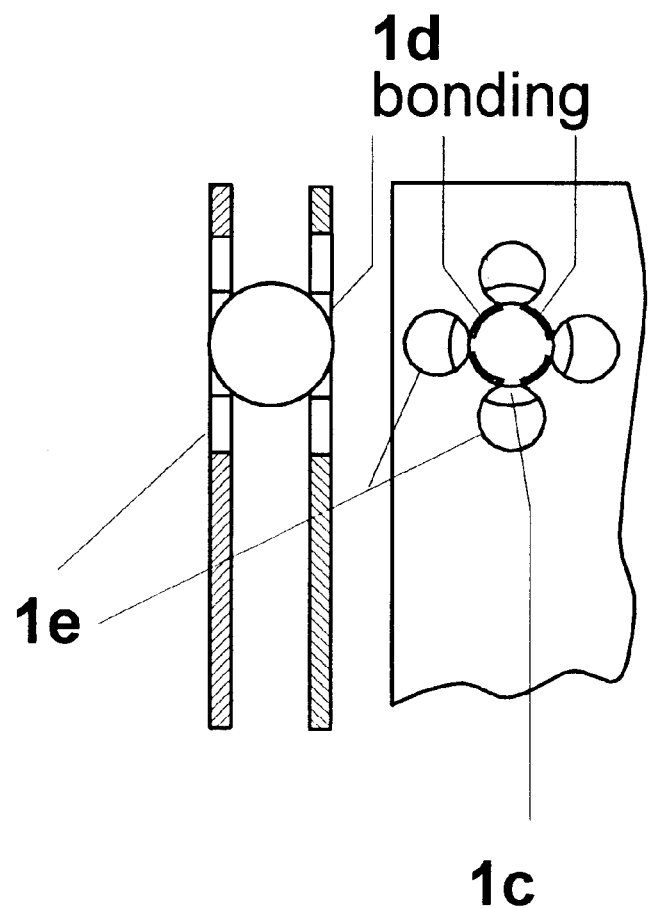
Figure 4:
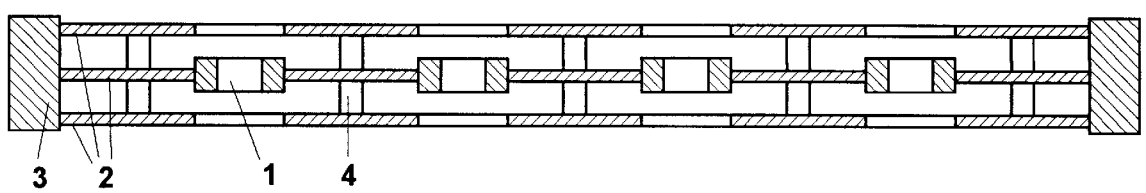
FIG. 4 Reference object for the measurement of the errors of geometry of coordinate measuring machines and machine tools in the form of a sandwich structure with three panes FIG. 5 Manual assembling process for the reference object, allowing the same tools to be used for different object sizes and for different layouts of the arrays.
Figure 5:
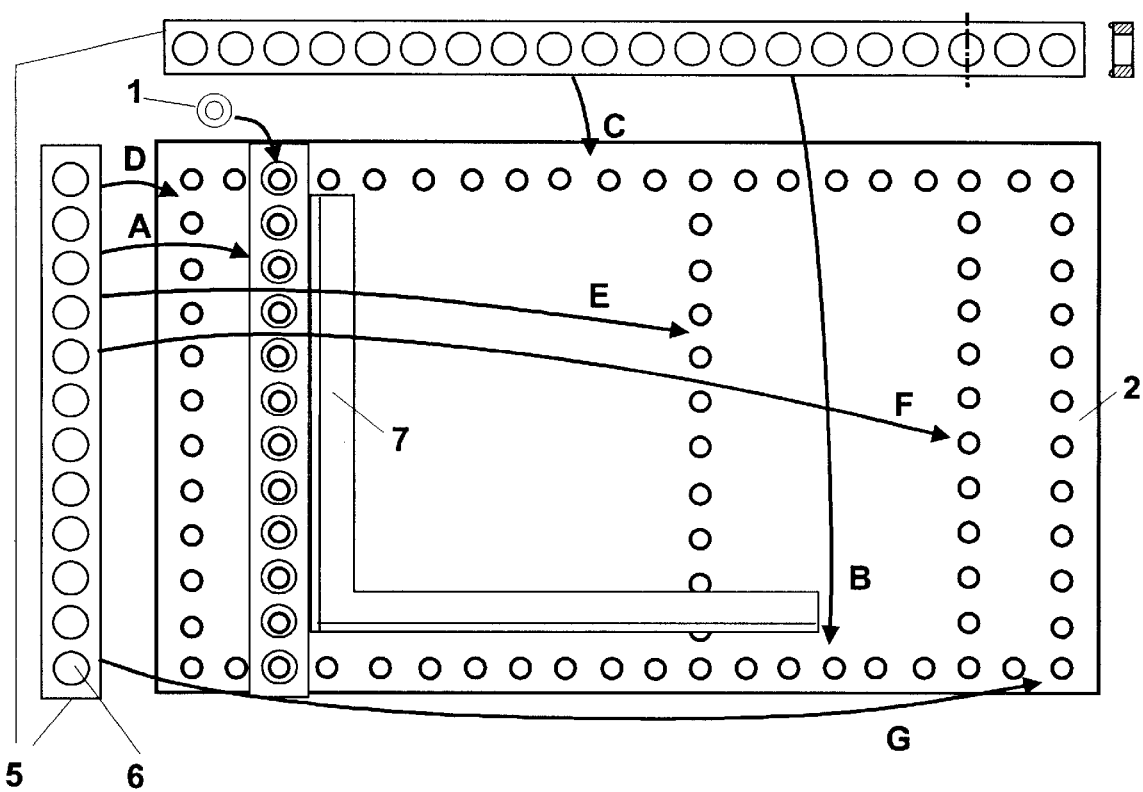

The entire reference object is economically assembled by manual labour. This allows the object to be tailored to the size of each individual client's machine at no extra cost. Tailoring is favourable to cover a machine's working space with as little object positions as possible during the tests, reducing the machine's down time for the tests to a minimum. The described design with its large tolerances allows the panes to be pre-fabricated, including the holes, by the supplier of the pane material, so that the final assembler need not perform chip removal operations like milling. FIG. 3 shows the steps (denoted by A to G in FIG. 3) of a possible manual assembly process where the probing elements are positioned and glued to the first pane: In step A, the probing elements (detail 1) are covered with resin at one end and inserted, with the resin-covered ends downwards, into the holes (detail 6) of a template (detail 5). After the first column has been fixed, a square (detail 7) helps to align the template orthogonal to the first column (step B), while the template is locked in one of the already fixed probing elements of the first column. In this way, arbitrary rows of probing elements can be successively glued (step C), followed by arbitrary columns (steps D, E, F, and G). A plurality of templates used simultaneously accelerates the assembly process. After fixing of all probing elements to the first pane, the second pane is bonded on top, matching the holes to the probing elements.

The design according to the invention also allows highly efficient batch production: Holes in the panes may be punched with sufficient accuracy; it is possible to punch a stack of several plates simultaneously. The gluing can be done using a ready-made two-dimensional mask to position the probing elements.

For the panes, materials with negligible thermal expansion coefficients are favourable. Such materials are, e.g., used for the windows in doors of furnaces. Panes of this material are available from stock and are thus cheaper than massive blocks of the same material. The use of material with a low thermal expansion coefficient increases the accuracy with which a machine can be inspected and reduces costs at the same time as compared with materials like aluminum and steel which have a high thermal expansion coefficient and thus require a costly and time consuming correction of thermal expansion.

The design according to the invention is applicable with advantage both to one-dimensional (hole or ball beams) and two-dimensional reference objects (hole or ball plates).

Having described the reference object in detail, I claim:

1. Reference object made of a plurality of parallel panes, firmly connected to each other with a spacing in-between and with a plurality of probing elements located in the spacing between these panes, said probing elements being firmly connected to the panes and thus establishing an array of reference points defined by the probing elements' surfaces that are probed by a machine under inspection through holes in the panes.

2. Reference object according to claim 1, characterised in that the probing elements themselves serve to fix the panes to one another, thereby establishing the desired spacing between the panes.

3. Reference object according to claim 1, wherein the probing elements are spheres which are flattened at the poles to facilitate their stable fixing to the panes.

* * * * *